US012672039B2

(12) United States Patent
Lee et al.

(10) Patent No.: US 12,672,039 B2
(45) Date of Patent: Jun. 30, 2026

(54) SYSTEMS, METHODS, AND DEVICES FOR WIRELESS MEDIUM RESERVATION MITIGATION USING CHANNEL SWITCHING ANNOUNCEMENT

(71) Applicant: Cypress Semiconductor Corporation, San Jose, CA (US)

(72) Inventors: Hyun Jong Lee, Seoul (KR); Chi Woo Lee, Namyangju-si (KR); Heok Je Kim, Seoul (KR); Young San Kim, Goyang-si (KR)

(73) Assignee: Cypress Semiconductor Corporation, San Jose, CA (US)

( * ) Notice: Subject to any disclaimer, the term of this patent is extended or adjusted under 35 U.S.C. 154(b) by 285 days.

(21) Appl. No.: 18/490,382

(22) Filed: Oct. 19, 2023

(65) Prior Publication Data

US 2025/0133458 A1 Apr. 24, 2025

(51) Int. Cl.
| | |
|---|---|
| *H04W 36/06* | (2009.01) |
| *H04W 28/08* | (2023.01) |
| *H04W 28/20* | (2009.01) |
| *H04W 36/30* | (2009.01) |
| *H04W 72/0453* | (2023.01) |

(52) U.S. Cl.
CPC ....... *H04W 36/06* (2013.01); *H04W 28/0983* (2020.05); *H04W 28/20* (2013.01); *H04W 36/304* (2023.05); *H04W 72/0453* (2013.01)

(58) Field of Classification Search
None
See application file for complete search history.

(56) References Cited

U.S. PATENT DOCUMENTS

| | | | |
|---|---|---|---|
| 2006/0120284 A1* | 6/2006 | Kim ................... | H04L 63/0236 |
| | | | 709/225 |
| 2017/0127452 A1* | 5/2017 | Ahmed ............. | H04W 72/0446 |
| 2021/0136820 A1* | 5/2021 | Medapalli ............. | H04W 24/08 |
| 2024/0008062 A1* | 1/2024 | Chu ....................... | H04W 72/04 |

* cited by examiner

*Primary Examiner* — Anh Ngoc M Nguyen

(57) ABSTRACT

Systems, methods, and devices improve medium usage by wireless devices. Methods include determining, using one or more processing elements, a wireless channel switch operation should be performed by a first wireless device and a second wireless device communicating using a first wireless channel, and identifying, using the one or more processing elements, one or more mitigation operations based on data packet activity associated with the wireless channel. Methods further include generating, using the one or more processing elements, a mitigation signal responsive to identifying medium reservation activity within the data packet activity, and initiating, using the one or more processing elements, the wireless channel switch operation to switch to a second wireless channel.

20 Claims, 6 Drawing Sheets

Boundary
112

Devices
110

2023P01925 US

Devices
108

Wireless
Device 102

104

106    105

Boundary
114

100

SYSTEMS, METHODS, AND DEVICES FOR WIRELESS MEDIUM RESERVATION MITIGATION USING CHANNEL SWITCHING ANNOUNCEMENT

TECHNICAL FIELD

This disclosure relates to wireless communications and wireless devices, and more specifically, to enhancement of medium usage by such wireless devices.

BACKGROUND

Wireless devices may be implemented in a variety of different operational contexts and may communicate with each other via one or more wireless communications channels. More specifically, a wireless device may be implemented in an automobile and may communicate with one or more components of the automobile. In one example, such a component may be a head unit of an infotainment system of the automobile. Accordingly, such wireless devices may be implemented in an environment that is mobile, and may enter and exit proximity of other wireless devices. Conventional implementation of such wireless devices and systems remain limited because they are not able to maintain efficient communications medium usage and/or implement channel switches when encountering hidden nodes that exhibit medium reservation behavior.

DETAILED DESCRIPTION

Figure 1A:
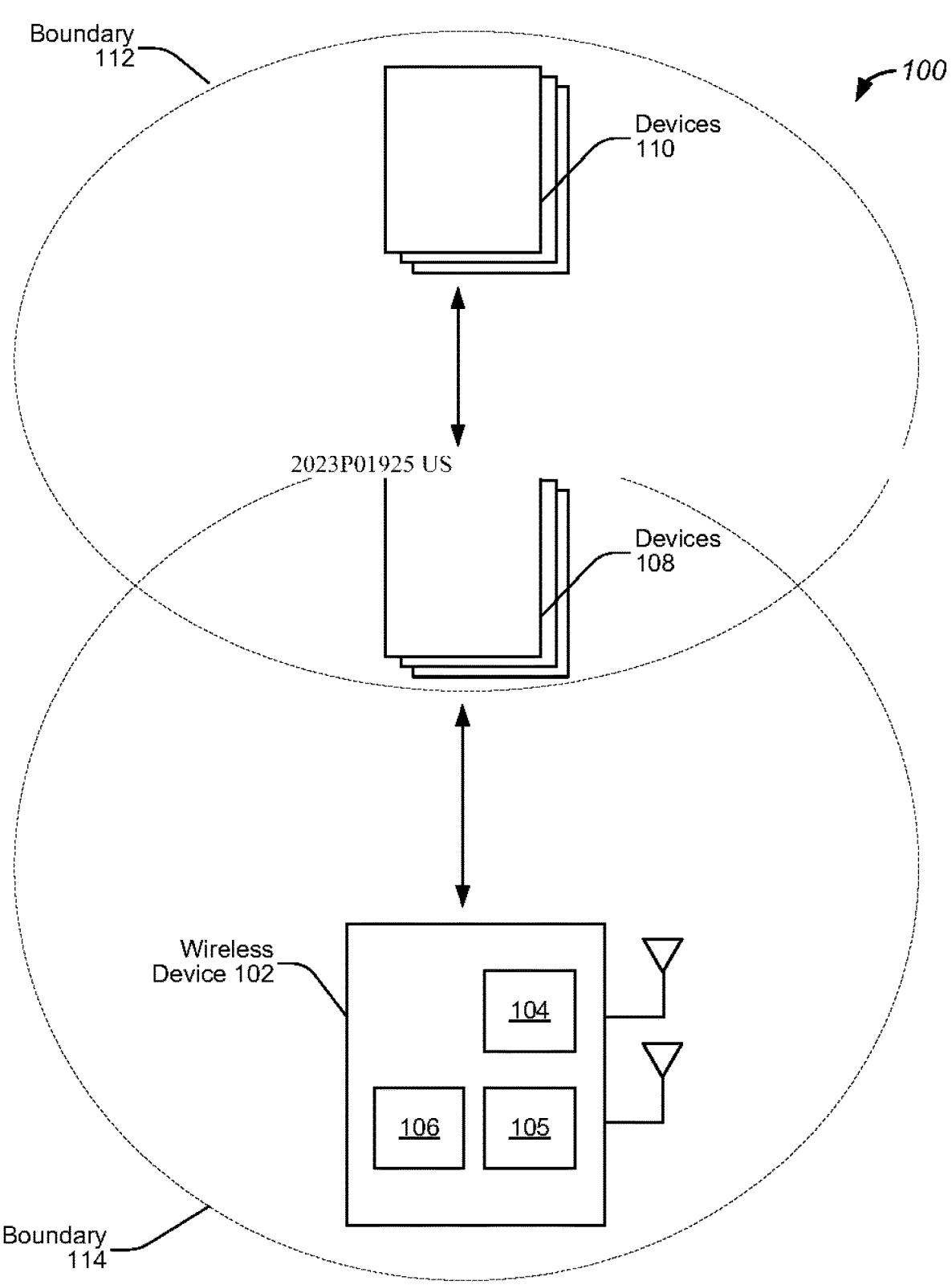
FIG. 1A illustrates an example of a system for channel switch enhancement, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless devices may communicate with each other using one or more wireless communications protocols, such as a Wi-Fi protocol or a Bluetooth protocol. For example, wireless devices may communicate with each other using IEEE 802.11 or IEEE 802.15 wireless protocols. In a wireless environment, there may be many wireless devices that operate on different networks but share access to the same wireless channels. As disclosed herein, a wireless channel refers to a portion of a network medium used for communication (e.g., a frequency band). To reduce co-channel interference, wireless devices may use a channel in accordance with a carrier sense multiple access with collision avoidance (CSMA-CA) protocol.

The CSMA/CA protocol utilizes carrier sensing to avoid multiple wireless devices transmitting on the same channel at the same time. Carrier sensing detects whether a channel is idle or busy and includes physical carrier sensing and/or virtual carrier sensing. While physical carrier sensing detects whether the channel is busy due to a current frame, virtual carrier sensing detects whether the channel is busy or reserved for future frames to be transmitted immediately following the current frame.

Virtual carrier sensing allows wireless devices to reserve the channel for frames it intends to communicate. The reservation duration may be carried in the 802.11 media access control (MAC) header duration field, which is part of the MAC protocol data unit (MPDU) exchanged between MAC entities (e.g., of wireless devices). The duration value in the MAC header indicates the time required to complete the transmission of frames, including interframe spacing, after the current frame (e.g., the frame in which the duration value resides). The duration value represents one or more interframe spacings (e.g., short interframe spacing (SIFS)), and the time in microseconds for the intended recipient to communicate a one or more frames with the sender. Wireless devices that are able to decode the 802.11 MAC header extract the duration field value and save it as a network allocation vector (NAV) value to mark the medium as busy for the amount of time specified (e.g., in microseconds). The wireless device then counts down from the initial NAV value and may consider the channel to be busy or reserved for as long as the NAV value is non-zero.

Some devices may be considered "hog devices" that exhibit aggressive medium reservation activity. For example, components of a telecommunications infrastructure engaged in frequent transmissions of large amounts of data to numerous wireless devices may transmit many medium reservation packets which effectively "hog" usage of that wireless channel and result in inefficient usage of that wireless channel by other wireless devices using that wireless channel even if not connected to the network of the hog device.

Moreover, wireless devices may implement channel switching operations to switch wireless channels for a variety of reasons, such as channel performance. Such channel switching operations may be performed using channel switch announcement frames that are used to coordinate channel switches between wireless devices and maintain device association. Medium reservation activity from hog devices may interfere with the reception of such channel switch announcement frames, and thus interfere with the process of switching channels. Accordingly, conventional systems and devices are not able to efficiently identify the presence of such hog devices or counteract such aggressive medium reservation activity to facilitate implementation of channel switching between wireless devices.

Embodiments disclosed herein provide the ability to perform channel switching operations while mitigating the effects of medium reservation activity. As will be discussed in greater detail below, a mitigation signal may be generated and transmitted to reduce the effect of medium reservation activity, and ensure that channel switching communications are reliably received. More specifically, one or more mitigation signals may be generated and used in combination with channel switching operations to mitigate medium reservation activity-based interference. As will be also discussed in greater detail below, mitigation operations may include the generation of a mitigation signal which may be configured to clear a local NAV value. In various embodiments, the mitigation signal includes a frame transmitted at a selected time, power, length, direction, and/or frequency (e.g., using transmit beamforming or narrowband transmission) in order to interfere with the remote wireless device's ability to decode frames (e.g., reservations) sent by the hog device. In some embodiments, the mitigation signal may be a WLAN frame that causes a receiving wireless device to clear its own NAV. Such a frame may be a CFend frame or a vendor specific information element with instructions to ignore reservations sent by the hog device.

FIG. 1A illustrates an example of a system for channel switch enhancement, configured in accordance with some embodiments. Accordingly, a system, such as system 100, may include wireless devices that are used for wireless communications, and are also configured to be able to perform channel switching and medium reservation mitigation operations as disclosed herein. As will be discussed in greater detail below, wireless devices included in system 100 may be configured to mitigate activity of nodes that might otherwise result in excessive medium reservation for various operations, thus reducing interference experienced during channel switching operations of wireless devices.

Accordingly, system 100 includes wireless device 102 which may be a wireless communications device. As discussed above, such wireless devices may be compatible with one or more wireless transmission protocols, such as a Wi-Fi protocol or a Bluetooth protocol. In some embodiments, wireless device 102 includes collocated transceivers. For example, wireless device 102 may include a Wi-Fi transceiver and a Bluetooth transceiver that share access to a communications medium. For example, wireless device 102 may include a first transceiver, such as transceiver 104, and a second transceiver, such as transceiver 105. Transceiver 104 may be compatible with a Wi-Fi specification and protocol, and transceiver 105 may be compatible with a Bluetooth specification and protocol. For example, the Bluetooth protocol may be a Bluetooth Low Energy (BLE) protocol. Moreover, wireless device 102 may include one or more antennas, and may also include processing device 106. As will be discussed in greater detail below, such processing devices and transceivers are configured to establish communications connections with other devices, and transmit data in the form of data packets via such communications connections.

In some embodiments, wireless device 102 may be a head unit included in an infotainment system of a vehicle, such as an automobile. Accordingly, wireless device 102 may be configured as an access point, and may be configured to communicate with various devices in an automobile environment, such as devices operated by passengers of the automobile. Wireless device 102 may also be configured to communicate with devices of other networks, such as other access points. As will be discussed in greater detail below, wireless device 102 is configured to perform channel switching operations to change wireless channels used for wireless communication. For example, wireless device 102 is configured to use channel switch announcement frames in accordance with an 802.11 protocol to announce the intent to switch channels and also include information associated with the new channel, such as the identity of the channel being switched to.

As discussed above, system 100 also includes devices 108 which are also wireless devices. More specifically, devices 108 may be compatible with one or more wireless transmission protocols, such as a Wi-Fi protocol or a Bluetooth protocol. In some embodiments, devices 108 may be configured as stations in communication with wireless device 102. Moreover, each of devices 108 may include one or more antennas, as well as processing devices and transceivers, which may also be configured to establish communications connections with other devices, and transmit data in the form of data packets via such communications connections. As similarly discussed above, devices 108 are also configured to perform switching operations. For example, devices 108 may receive a channel switch announcement frame and return an acknowledgement message to commence the channel switch.

In various embodiments, devices 108 are included in the vehicular environment associated with wireless device 102. For example, wireless device 102 may be a head unit of an infotainment system in an automobile, and devices 108 may be wireless devices such as a smart device or smartphone operated by a passenger within the automobile. It will be appreciated that devices 108 may be any suitable device, such as those found in cars, other vehicles, gaming systems, wearable devices, and even medical implants.

System 100 also includes devices 110 which are also wireless devices. In various embodiments, devices 110 are part of a wireless infrastructure, such as those that may be included in a Cambium network. Accordingly, devices 110 may be base stations or other components of a telecommunications network. Moreover, devices 110 may be configured as an access point to a larger communications network of, for example, a telecommunications provider. Devices 110 may also include processing devices and transceivers compatible with one or more wireless transmission protocols, such as a Wi-Fi protocol. As will be discussed in greater detail below, devices 110 may transmit medium reservation packets to reserve a medium, such as a Wi-Fi channel, for data transmission operations associated with devices 110.

As shown in FIG. 1, devices 110 may be in communication with devices 108, but not with wireless device 102, as denoted by boundary 112. Moreover, wireless device 102 may be in communication with devices 108, but not with devices 110, as denoted by boundary 114. Accordingly, from the perspective of wireless device 102, a device included in devices 110 is a hidden node, and is not visible to wireless device 102. Accordingly, wireless device 102 is not aware of medium reservation activity of devices 110 that is affecting operation of devices 108. As will be discussed in greater detail below, wireless device 102 is configured infer the presence of such medium reservation activity, and is further configured to generate and implement a mitigation signal responsive to such a determination to mitigate the effects of such medium reservation activity during a channel switch operation.

Figure 1B:
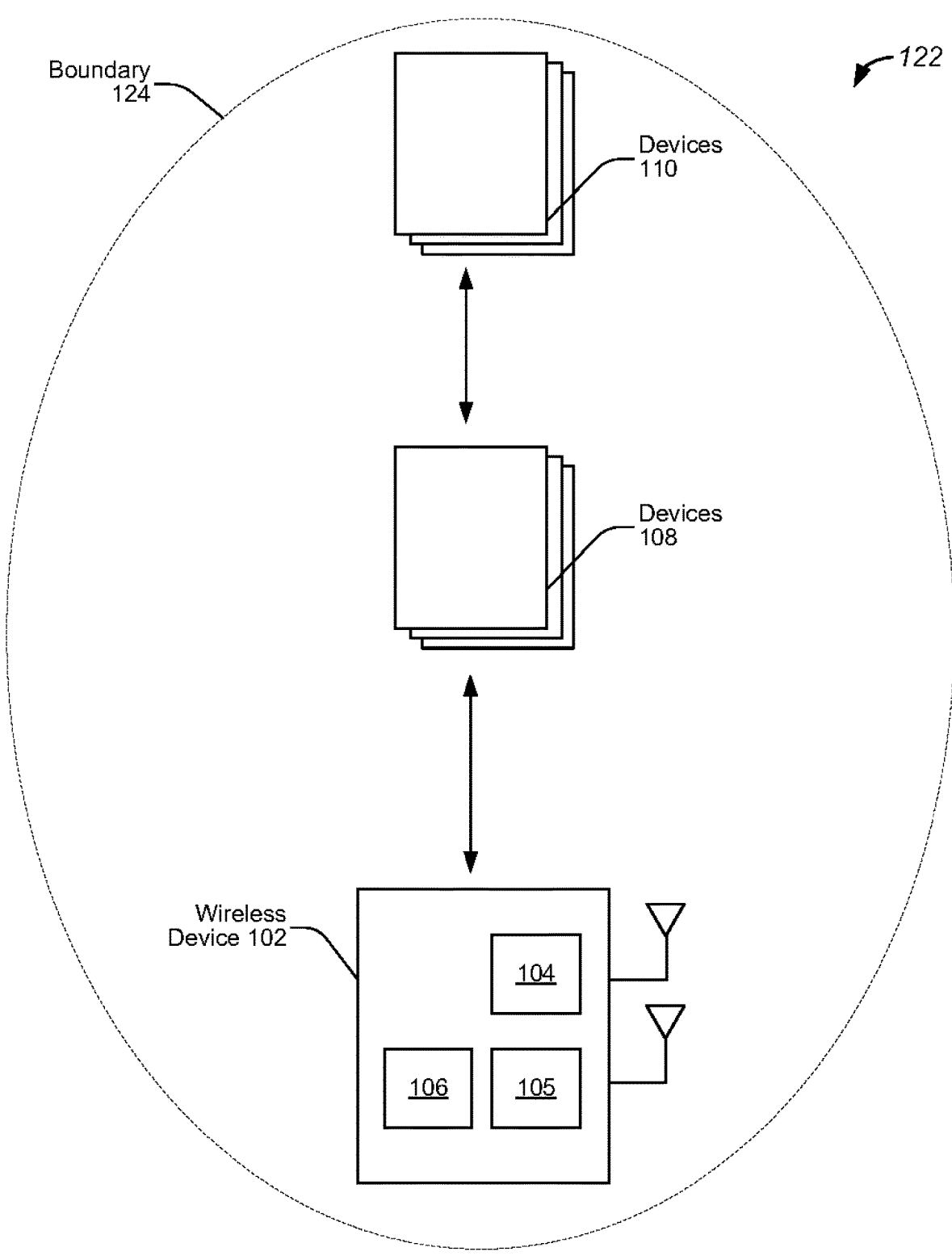
FIG. 1B illustrates another example of a system for channel switch enhancement, configured in accordance with some embodiments.

FIG. 1B illustrates another example of a system for channel switch enhancement, configured in accordance with some embodiments. A system, such as system 122, may include wireless devices as similarly discussed above. For example, system 122 includes wireless device 102, devices 108 and devices 110. As shown in FIG. 1B, both wireless device 102 and devices 108 are within communications range of devices 110, as shown by boundary 124. In this example, the medium reservation activity of devices 110 is detectable by both wireless device 102 and devices 108. In this example, wireless device 102 is configured to generate the mitigation signal responsive to detecting the medium reservation activity, and is further configured to perform channel switching in combination with generated mitigation signal.

Figure 2:
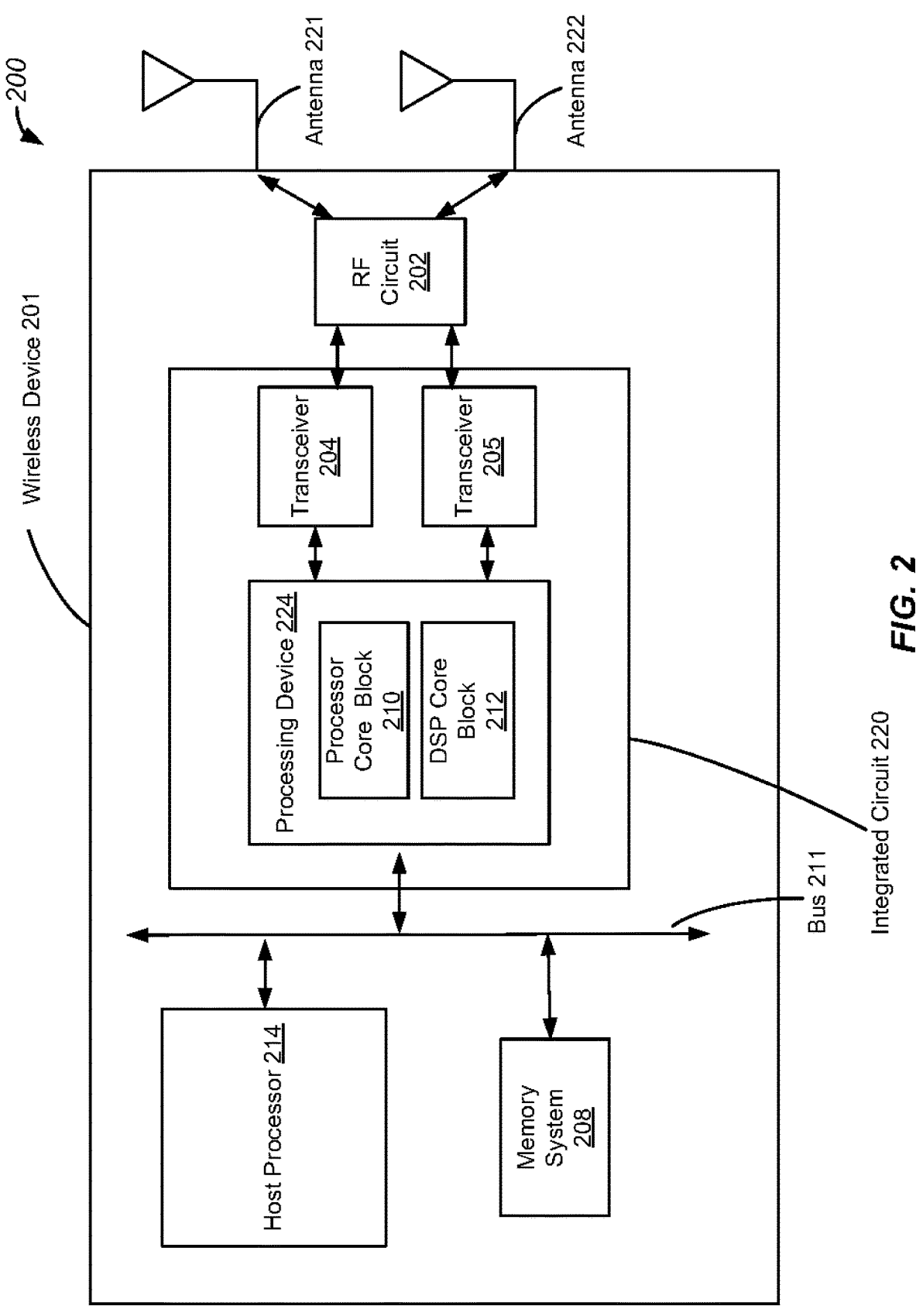
FIG. 2 illustrates an example of a device for channel switch enhancement, configured in accordance with some embodiments.

FIG. 2 illustrates an example of a device for channel switch enhancement, configured in accordance with some embodiments. More specifically, FIG. 2 illustrates an example of a system, such as system 200, that includes wireless device 201. It will be appreciated that wireless device 201 may be one of any of the wireless devices discussed above with reference to FIG. 1, such as wireless device 102, devices 108, and devices 110. Accordingly, wireless device 201 may be configured as a head unit of an infotainment system.

In various embodiments, system 200 includes one or more transceivers, such as transceiver 204 and transceiver 205. In one example, transceiver 204 is configured to transmit and receive signals using a communications medium that may include antenna 221 or antenna 222. As noted above, transceiver 204 may be a Wi-Fi transceiver. Accordingly, transceiver 204 may be compatible with a Wi-Fi communications protocol, such as an 802.11ax protocol. In various embodiments, transceiver 204 includes a modulator and demodulator as well as one or more buffers and filters, that are configured to generate and receive signals via antenna 221 and/or antenna 222.

System 200 additionally includes transceiver 205 which may be collocated with transceiver 204 in wireless device 201. In various embodiments, transceiver 205 is also be configured to transmit and receive signals using a communications medium that may include antenna 221 or antenna 222. Accordingly, transceiver 205 may be a Bluetooth transceiver compatible with a Bluetooth communications protocol. In one example, the Bluetooth protocol may be a Bluetooth Low Energy (BLE) protocol. Moreover, transceiver 205 includes a modulator and demodulator as well as one or more buffers and filters, that are configured to generate and receive signals via antenna 221 and/or antenna 222. While various embodiments are described with reference to Bluetooth and Wi-Fi communications protocols, it will be appreciated that any suitable protocol may be used.

In various embodiments, system 200 further includes processing device 224 which may include logic implemented using processing elements and/or one or more processor cores. Accordingly, processing device 224 is configured to implement mitigation signal generation operations and channel switching operations, as will be discussed in greater detail below. In various embodiments, processing device 224 includes processing elements that are configured to implement such mitigation signal generation operations and channel switching operations. For example, processing device 224 may be configured to implement an application buffer monitor configured to perform buffer monitoring operations as disclosed herein, and is also configured to generate channel switch announcement frames and perform associated channel switches. Moreover, processing device 224 includes one or more components configured to implement a medium access control (MAC) layer that is configured to control hardware associated with a wireless transmission medium, such as that associated with a Wi-Fi transmission medium and channel switching operations. In one example, processing device 224 may include processor core block 210 that may be configured to implement a driver, such as a Bluetooth and/or Wi-Fi driver. Processing device 224 may further include digital signal processor (DSP) core block 212 which may be configured to include microcode.

In various embodiments, processor core block 210 comprises multiple processor cores which are each configured to implement specific portions of a wireless protocol interface. For example, a Bluetooth protocol may be implemented using a Bluetooth stack in which software is implemented as a stack of layers, and such layers are configured to compartmentalize specific functions utilized to implement the Bluetooth communications protocol. In various embodiments, a host stack includes layers for a Bluetooth network encapsulation protocol, radio frequency communication, service discovery protocol, as well as various other high level data layers. Moreover, a controller stack includes a link management protocol, a host controller interface, a link layer which may be a low energy link layer, as well as various other timing critical layers.

System 200 further includes radio frequency (RF) circuit 202 which is coupled to antenna 221 and antenna 222. In various embodiments, RF circuit 202 may include various components such as an RF switch, a diplexer, and a filter. While FIG. 2 illustrates system 200 as having two antennas, it will be appreciated that system 200 may have a single antenna, or any suitable number of antennas. Accordingly, RF circuit 202 may be configured to select an antenna for transmission/reception, and may be configured to provide coupling between the selected antenna, such as antenna 221, and other components of system 200 via a bus, such as bus 211. While one RF circuit is shown, it will be appreciated that wireless device 201 may include multiple RF circuits. Accordingly, each of multiple antennas may have its own RF circuit. Moreover, each one may be associated with a particular wireless communications protocol, such as a first antenna and RF circuit for Wi-Fi and a second antenna and RF circuit for Bluetooth.

System 200 includes memory system 208 which is configured to store one or more data values associated with mitigation signal generation operations and channel switching operations discussed above and in greater detail below. Accordingly, memory system 208 includes storage device, which may be a non-volatile random access memory (NVRAM) or non-volatile static random access memory (NVSRAM) configured to store such data values, and may also include a cache that is configured to provide a local cache. In various embodiments, system 200 further includes host processor 214 which is configured to implement processing operations implemented by system 200.

It will be appreciated that one or more of the above-described components may be implemented on a single chip, or on different chips. For example, transceiver 204, transceiver 205, and processing device 224 may be implemented on the same integrated circuit chip, such as integrated circuit chip 220. In another example, transceiver 204, transceiver 205, and processing device 224 may each be implemented on their own chip, and thus may be disposed separately as a multi-chip module or on a common substrate such as a printed circuit board (PCB). It will also be appreciated that components of system 200 may be implemented in the context of a low energy device, a smart device, or a vehicle such as an automobile. Accordingly, some components, such as integrated chip 220, may be implemented in a first location, while other components, such as antenna 221, may be implemented in second location, and coupling between the two may be implemented via a coupler such as RF circuit 202.

Figure 3:
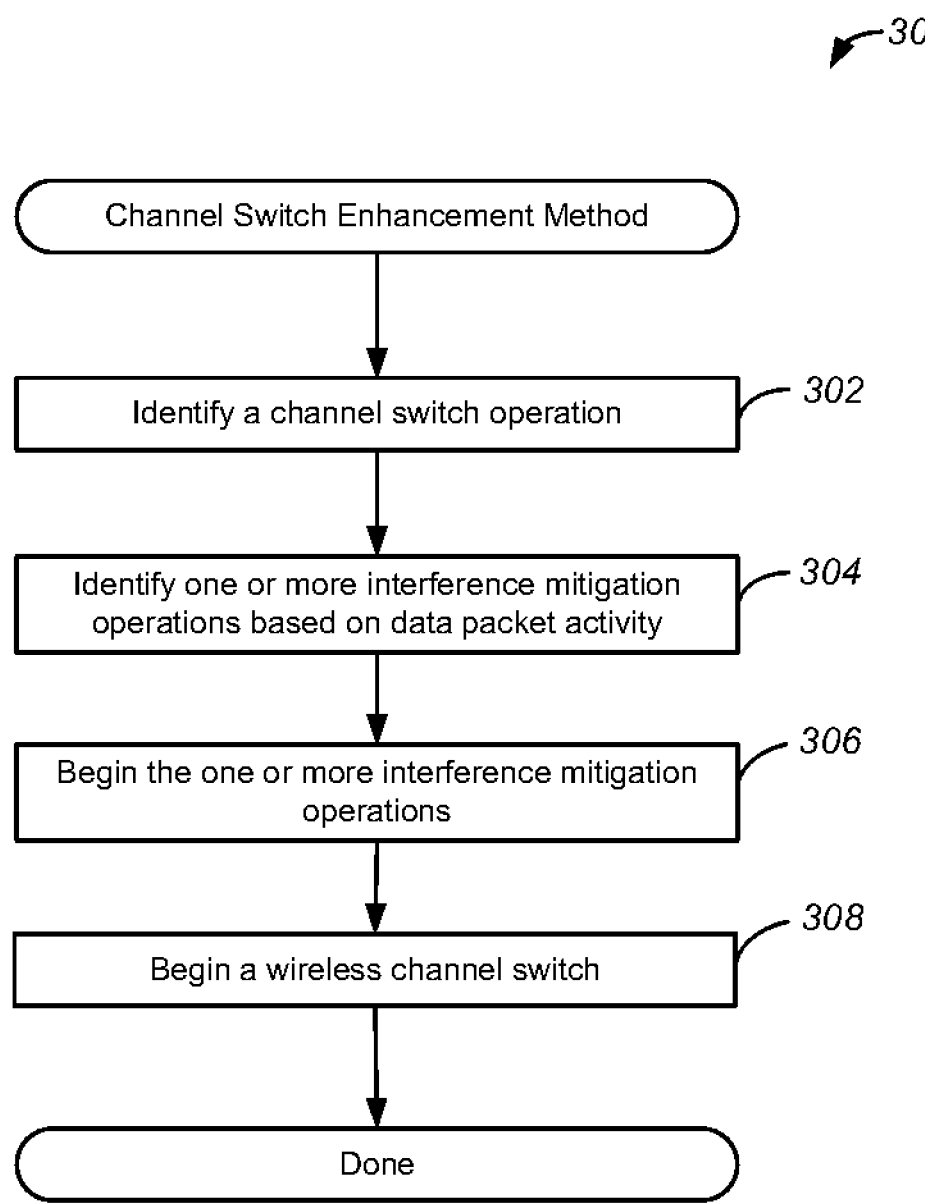
FIG. 3 illustrates an example of a method for channel switch enhancement, performed in accordance with some embodiments.

FIG. 3 illustrates an example of a method for channel switch enhancement, performed in accordance with some embodiments. Accordingly, a method, such as method 300, may be performed to generate mitigation signals and switch channels. As will be discussed in greater detail below, method 300 may be performed to mitigate activity of nodes that might otherwise result in excessive medium reservation for various operations, thus reducing interference experienced during channel switching operations of wireless devices.

Method 300 may perform operation 302 during which a channel switch operation may be identified. Accordingly, a system component, such as a head unit, may determine that a channel switch should be implemented. As will be discussed in greater detail below, such a determination may be made based on one or more channel switching parameters that may define conditions under which a channel switch should be implemented. For example, such parameters may include threshold values used to determine that a signal quality metric has dropped. Parameters may also include temporal parameters that designate a period of time after which a channel switch should be implemented.

Method 300 may perform operation 304 during which one or more interference mitigation operations may be identified based, at least in part, on data packet activity. As similarly discussed above, interference mitigation operations may be identified based on an identification of medium reservation activity. For example, the head unit may be in range of a device exhibiting medium reservation activity, or the head unit may infer the presence of such a device based on behavior of a peripheral device, such as a smartphone, that the head unit is in communication with. If it is determined that medium reservation activity is present, the head unit may determine a mitigation signal should be generated. Accordingly, the identified interference mitigation operations may include generation of the mitigation signal in accordance with one or more mitigation parameters.

Method 300 may perform operation 306 during which the one or more interference mitigation operations may be performed. Accordingly, if the medium reservation activity is detected, a wireless device, such as a head unit, may generate the mitigation signal and send the mitigation signal to the peripheral device. As will be discussed in greater detail below, the mitigation signal may cause the peripheral device to perform one or more operations, such as resetting a local network allocation vector (NAV) value.

Method 300 may perform operation 308 during which a wireless channel switch may be performed. Accordingly, once the mitigation signal has been received at a device, such as the peripheral device, channel switching operations may be performed to switch a communication channel used by the head unit and peripheral device. In this way, the mitigation signal may be selectively deployed to prevent medium reservation activity from interfering with the channel switch.

Figure 4:
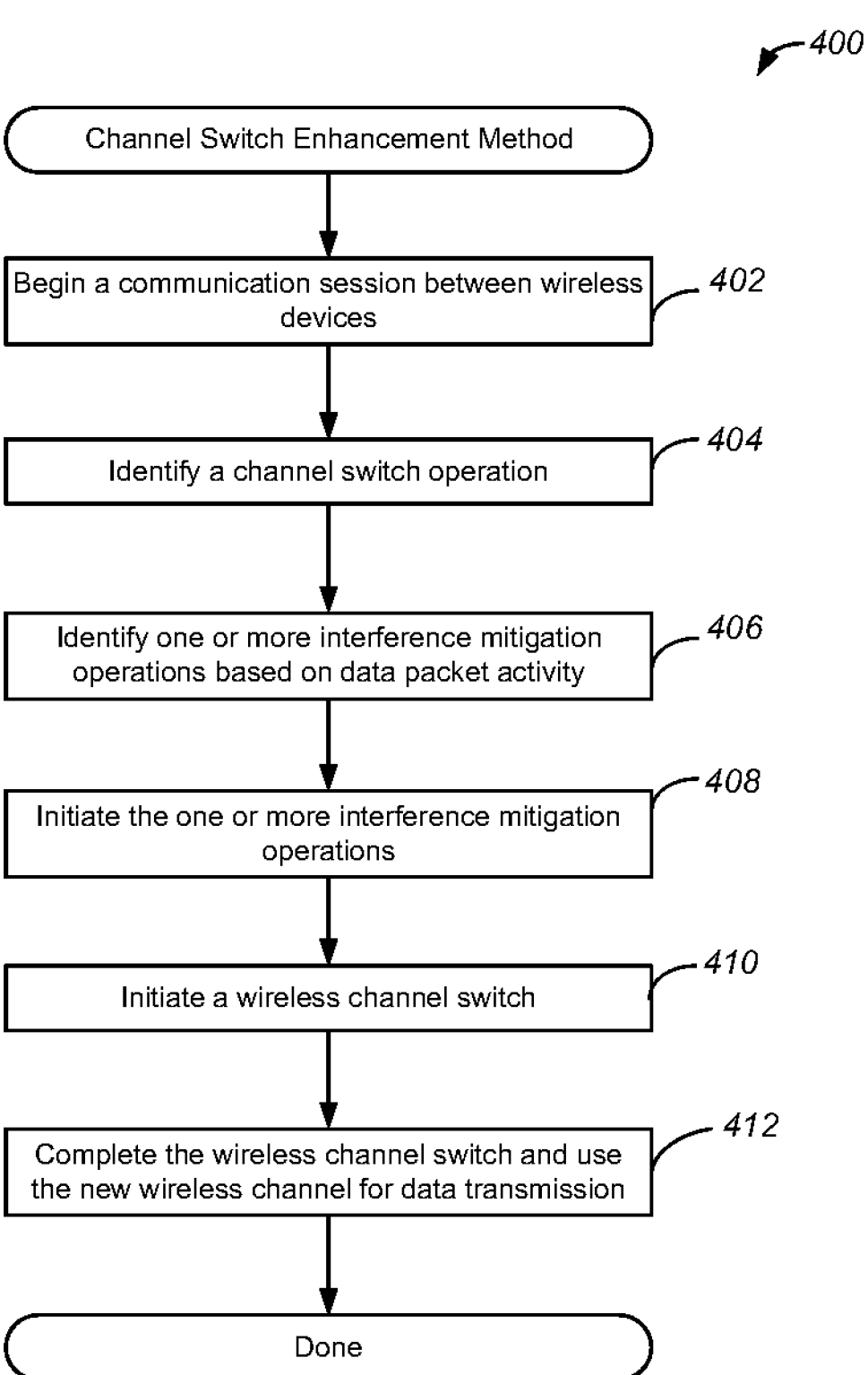
FIG. 4 illustrates another example of a method for channel switch enhancement, performed in accordance with some embodiments.

FIG. 4 illustrates another example of a method for channel switch enhancement, performed in accordance with some embodiments. Accordingly, a method, such as method 400, may be performed to generate mitigation signals and to switch channels. As will be discussed in greater detail below, method 400 may be performed to mitigate activity of nodes that might otherwise result in excessive medium reservation for various operations, thus reducing interference experienced during channel switching operations of wireless devices.

Method 400 may perform operation 402 during which wireless devices may begin a communication session. As similarly discussed above, devices implemented in a wireless environment may initiate a communication session to exchange data that may be used by one or more applications executed by the wireless devices. For example, a head unit of an infotainment system included in a vehicle may communicate with a wireless device, such as a smartphone, of a passenger located inside the vehicle. Communications may be managed via a dedicated vehicle communication application, such as CarPlay® provided by Apple Inc. of Cupertino, California, or Android Auto provided by Google Inc. of Mountain View, California.

Method 400 may perform operation 404 during which a channel switch operation may be identified. As similarly discussed above, a system component, such as a head unit, may determine that a channel switch should be performed. Accordingly, the identifying of the channel switch operation may include determining that a channel switch should be performed, and identifying a channel that will be switched to.

Moreover, such a determination may be made based on one or more channel switching parameters that may define conditions under which a channel switch should be implemented. For example, such parameters may include threshold values used to determine that a signal quality metric has dropped. In various embodiments, the signal quality metric may be a received signal strength indicator (RSSI) value. Accordingly, a channel switch operation may be identified in response to identifying a threshold crossing where an RSSI value of a current wireless channel drops below a designated threshold value. In some embodiments, the signal quality metric may be a packet loss rate. Thus, the channel switch operation may be identified in response to a dynamic determination made based on the performance and/or signal quality of a current wireless channel being used by the wireless devices.

In various embodiments, the switching parameters may also include temporal parameters that designate a period of time after which a channel switch should be implemented. Accordingly, channel switch operations may be performed periodically, and based on a designated schedule as may be determined by an entity, such as a manufacturer, an application, such as a vehicle communication application, and/or one or more parameters of a wireless standard.

Method 400 may perform operation 406 during which one or more interference mitigation operations may be identified based on data packet activity. As will be discussed in greater detail below, interference mitigation operations may be identified based on an identification of medium reservation activity. More specifically, a head unit may be in range of a device exhibiting medium reservation activity, or the head unit may infer the presence of such a device based on behavior of a peripheral device, such as a smartphone, that the head unit is in communication with. Accordingly, the head unit may make a determination that medium reservation activity is present based on medium reservation data packets received from an additional wireless device, such as a hog device discussed above. The head unit may also make such a determination based on observed activity and performance of a peripheral device. Such observed behavior may include one or more data throughput metrics, such as a buffer status identifying a buffer level of the application dropping below a designated threshold level. In various embodiments, the buffer may be an application buffer of the vehicle communication application implemented at the head unit, and used as a buffer for a connection with the peripheral device.

In some embodiments, a data throughput drop may be decoupled from a corresponding drop in signal strength metrics. For example, in a hidden node context, data throughput may drop, but an RSSI value and a signal to noise ratio (SNR) may stay the same. Accordingly, the presence of a hidden node may be inferred based on application buffer activity, and independent of signal strength metrics.

If it is determined that medium reservation activity is present, the head unit may determine a mitigation signal data pattern. Accordingly, as will be discussed in greater detail below, a mitigation signal data pattern includes transmission of mitigation data packets that have a designated periodicity as well as a designated duration for the mitigation data packets. The mitigation data packets may be sent from the head unit to other wireless devices, such as the peripheral device. Moreover, the designated periodicity and designated duration may be determined by an entity, such as a manufacturer or an administrator, and may be configured based on performance parameters of the head unit and the wireless device. In some embodiments, the mitigation data packets have a fixed periodicity with a fixed amount of time between data packets. In various embodiments, the mitigation packets have a varying periodicity where an amount of time between data packets is varied by some amount by, for example, applying an amount of jitter to a fixed period.

Method 400 may perform operation 408 during which the one or more interference mitigation operations may be initiated. Accordingly, if the medium reservation activity is detected, a wireless device, such as a head unit, may generate the mitigation signal and send the mitigation signal to the peripheral device. As will be discussed in greater detail below, mitigation data packets included in the mitigation signal are configured to cause the peripheral device to perform one or more operations, such as resetting a local NAV value.

Method 400 may perform operation 410 during which a wireless channel switch may be initiated. Accordingly, once the mitigation signal has been received at a device, such as the peripheral device and mitigation operations have been performed responsive to receiving the mitigation signal, channel switching operations may be performed to switch a communication channel used by the head unit and peripheral device. In this way, the mitigation signal may be selectively deployed in a manner that is integrated with a channel switch operation to prevent medium reservation activity from interfering with the channel switch operation.

Method 400 may perform operation 412 during which the wireless channel switch may be completed, and the new wireless channel may be used for data transmission. Accordingly, the head unit may transmit one or more beacon frames to facilitate and coordinate the channel switch to the new wireless channel, and both the head unit and the peripheral device may transition to the new wireless channel. The new wireless channel may then be used for subsequent communications.

Figure 5:
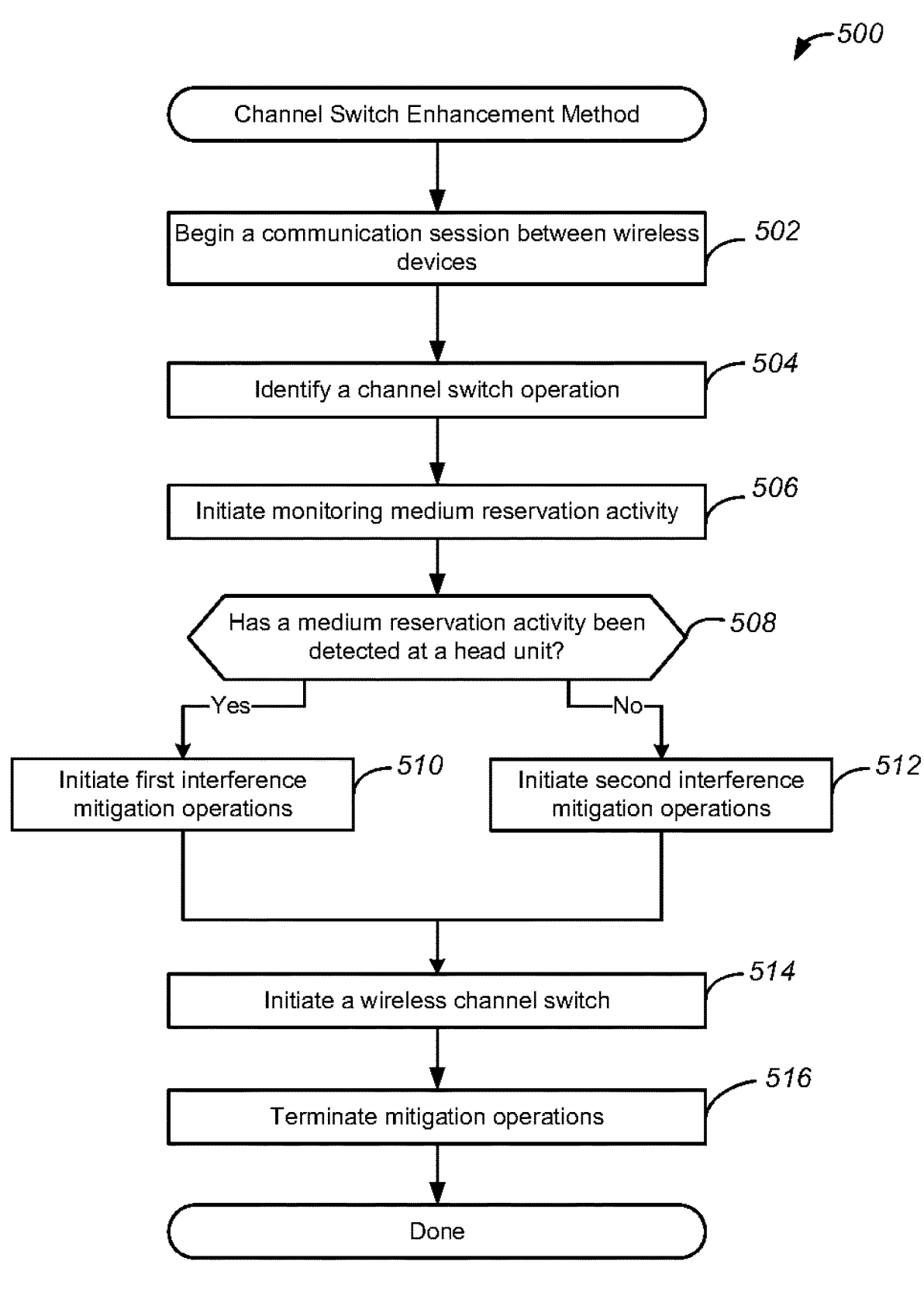
FIG. 5 illustrates an additional example of a method for channel switch enhancement, performed in accordance with some embodiments.

FIG. 5 illustrates an additional example of a method for channel switch enhancement, performed in accordance with some embodiments. Accordingly, a method, such as method 500, may be performed to generate mitigation signals and to switch channels. As will be discussed in greater detail below, method 500 may be performed to dynamically determine mitigation operations that are performed during a channel switch operation. In this way, the mitigation signal may be configured and selectively deployed based on dynamic and current operational conditions of a peripheral device.

Method 500 may perform operation 502 during which wireless devices may begin a communication session. As similarly discussed above, devices implemented in a wireless environment may initiate a communication session to exchange data that may be used by one or more applications executed by the wireless devices. For example, a head unit of an infotainment system included in a vehicle may communicate with a wireless device, such as a smartphone, of a passenger located inside the vehicle. Communications may be managed via a dedicated vehicle communication application, such as CarPlay® provided by Apple Inc. of Cupertino, California, or Android Auto provided by Google Inc. of Mountain View, California.

Method 500 may perform operation 504 during which a channel switch operation may be identified. As similarly discussed above, a system component, such as a head unit, may determine that a channel switch should be performed. Accordingly, the identifying of the channel switch operation may include determining that a channel switch should be performed, and identifying a channel that will be switched to. As discussed above, such a determination may be made based on one or more channel switching parameters that may define conditions under which a channel switch should be implemented. Such parameters may include threshold values used to determine that a signal quality metric has dropped, or may include designated periodic parameters.

Method 500 may perform operation 506 during which monitoring of medium reservation activity may be initiated. As similarly discussed above, the monitoring of medium reservation activity may include monitoring whether or not a medium reservation data packet has been received at a device, such as head unit, or can be inferred based on performance of a peripheral device. Accordingly, during operation 506, a head unit may begin listening for a medium reservation data packet and may also begin monitoring behavior of the peripheral device, such as a buffer level of an application buffer.

Method 500 may perform operation 508 during which it may be determined if medium reservation activity has been detected at a head unit. As similarly discussed above, such a determination may be made based on whether or not a medium reservation data packet has been received at the head unit, or whether or not medium reservation activity has been inferred based on metrics obtained from a peripheral device. If it has been determined that medium reservation activity has been detected at the head unit, method 500 may proceed to operation 510.

Accordingly, during operation 510, first interference mitigation operations may be initiated. As similarly discussed above, the mitigation operations may include configuration of mitigation signal data packets and determination of a data pattern for the mitigation signal. In various embodiments, the interference mitigation operations may be configured based on medium reservation activity that was detected. For example, the head unit may determine a duration and repetition frequency of medium reservation packets based on such frames being received at the head unit. The head unit may then generate a mitigation signal that includes mitigation packets sent in a pattern configured based on the pattern of medium reservation packets such that a mitigation signal packet is received at a peripheral device a designated temporal offset after the arrival of a medium reservation packet. Such a designated temporal offset may be determined by an entity, such as manufacturer, based on previous design and testing operations. In some embodiments, the head unit may send a mitigation signal packet responsive to receiving a medium reservation packet. Accordingly, the mitigation signal may be dynamically responsive to detected medium reservation activity. As noted above, the mitigation signal packet may reset a local NAV of the peripheral device.

Returning to operation 508, if it is determined that no medium reservation activity has been detected at the head unit, but has been inferred based on one or more data throughput metrics, method 500 may proceed to operation 512 during which it may be determined that second mitigation operations may be performed. In various embodiments, the second mitigation operations may include inferring a pattern medium reservation activity, and generating a mitigation signal based on the inferred pattern. In some embodiments, the pattern of medium reservation activity may be inferred based on observed network traffic information which may include, for example, log data obtained during an observation period. In one example, the log data may identify periods of inactivity, and the periods of inactivity may be used to identify periodic medium reservation activity. Such periods may be used to determine a period for mitigation data packets included in the mitigation signal. In some embodiments, the timing of the mitigation data packet may also an offset configured such that the mitigation data packet is received at a peripheral device prior to the medium reservation data packet. In some embodiments, such a pattern may also be predetermined by an entity, such as a manufacturer based on device testing performed during a design process and expected behaviors of hidden nodes.

Method 500 may perform operation 514 during which a wireless channel switch may be initiated. Accordingly, as similarly discussed above, channel switching operations may be performed to switch a communication channel used by the head unit and peripheral device. The channel switching operations may include the transmission of a channel switch announcement data packet from the head unit to the peripheral device. As discussed above, the peripheral device may transmit an acknowledgment message in response to receiving the channel switch announcement data packet, and one or more beacon frames may be used to coordinate the switch to the new channel. If mitigation operations were previously identified and initiated, channel switch operations may be initiated once the mitigation signal has been received at a device, such as the peripheral device, and mitigation operations have been performed responsive to receiving the mitigation signal. If no mitigation operations were previously identified, the channel switching operations may be performed without the generation of a mitigation signal.

Method 500 may perform operation 516 during which mitigation operations may be terminated. Accordingly, if mitigation operations were previously initiated, such mitigation operations may be terminated during operation 516. More specifically, the head unit may terminate transmission of the mitigation signal. Furthermore, the mitigation signal may be terminated prior to completion of the channel switch. For example, the mitigation signal may terminate after reception of the acknowledgement message from the peripheral device and prior to the actual channel switch. It will be appreciated that if no mitigation operations were previously initiated, then operation 516 is not needed and is not performed.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   determining, using one or more processing elements, a wireless channel switch operation should be performed by a first wireless device and a second wireless device communicating using a first wireless channel;
   identifying, using the one or more processing elements, one or more mitigation operations based on data packet activity associated with the first wireless channel, the identifying being based on a presence of medium reservation activity identified based on one or more data throughput metrics associated with the second wireless device;
   generating, using the one or more processing elements, a mitigation signal responsive to identifying medium reservation activity within the data packet activity; and
   initiating, using the one or more processing elements, the wireless channel switch operation to switch to a second wireless channel.

2. The method of claim 1, wherein the mitigation signal is generated based on a designated data pattern, and wherein the mitigation signal comprises a plurality of mitigation data packets configured to reduce medium reservation by the second wireless device.

3. The method of claim 2, wherein the mitigation signal causes a reset of a local network allocation vector (NAV) value of the second wireless device.

4. The method of claim 1, wherein the medium reservation activity comprises medium reservation data packets sent by a third wireless device.

5. The method of claim 4, wherein the identifying of the one or more mitigation operations further comprises:
   monitoring, using the one or more processing elements, the one or more data throughput metrics associated with the second wireless device;
   identifying the presence of medium reservation activity associated with the third wireless device based, at least in part, on the one or more data throughput metrics.

6. The method of claim 5, wherein the identifying of the medium reservation activity is based on a threshold value crossing, and wherein the threshold value crossing is identified based on a status of an application buffer.

7. The method of claim 1, wherein the initiating of the wireless channel switch operation comprises:
   generating, at the first wireless device, a channel switch announcement frame; and
   transmitting the channel switch announcement frame to the second wireless device.

8. The method of claim 7 further comprising:
   receiving an acknowledgement message from the second wireless device; and
   terminating a transmission of the mitigation signal in response to receiving the acknowledgement message.

9. The method of claim 1, wherein the first wireless device is a head unit of an infotainment system included in an automobile.

10. A system comprising:
   a transceiver configured to transmit and receive data compatible with a wireless communications protocol;
   a processing device coupled to the transceiver and configured to:
      determine a wireless channel switch operation should be performed for a first wireless channel;
      identify one or more mitigation operations based on data packet activity associated with the first wireless channel, the identifying being based on a presence of medium reservation activity identified based on one or more data throughput metrics associated with the first wireless channel;

generate a mitigation signal responsive to identifying medium reservation activity within the data packet activity; and initiate the wireless channel switch operation to switch to a second wireless channel.

11. The system of claim 10, wherein the mitigation signal is generated based on a designated data pattern, and wherein the mitigation signal comprises a plurality of mitigation data packets configured to reduce medium reservation by a wireless device using the first wireless channel.

12. The system of claim 11, wherein the mitigation signal causes a reset of a local network allocation vector (NAV) value of the wireless device.

13. The system of claim 10, wherein the medium reservation activity comprises medium reservation data packets sent by an additional wireless device.

14. The system of claim 13, the processing device is further configured to:

monitor the one or more data throughput metrics associated with the first wireless channel; and identify the presence of medium reservation activity associated with the additional wireless device based, at least in part, on the one or more data throughput metrics.

15. The system of claim 10, wherein the processing device is further configured to:

generate a channel switch announcement frame;

transmit the channel switch announcement frame to a wireless device;

receive an acknowledgement message from the wireless device; and terminate a transmission of the mitigation signal in response to receiving the acknowledgement message.

16. A device comprising:

processing elements configured to:

determine a wireless channel switch operation should be performed for a first wireless channel;

identify one or more mitigation operations based on data packet activity associated with the first wireless channel, the identifying being based on a presence of medium reservation activity identified based on one or more data throughput metrics associated with the first wireless channel;

generate a mitigation signal responsive to identifying medium reservation activity within the data packet activity; and initiate the wireless channel switch operation to switch to a second wireless channel.

17. The device of claim 16, wherein the mitigation signal is generated based on a designated data pattern, wherein the mitigation signal comprises a plurality of mitigation data packets configured to reduce medium reservation by a wireless device using the first wireless channel, and wherein the mitigation signal causes a reset of a local network allocation vector (NAV) value of the wireless device.

18. The device of claim 16, wherein the medium reservation activity comprises medium reservation data packets sent by an additional wireless device.

19. The device of claim 18, the processing elements are further configured to:

monitor the one or more data throughput metrics associated with the first wireless channel; and identify the presence of medium reservation activity associated with the additional wireless device based, at least in part, on the one or more data throughput metrics.

20. The device of claim 16, wherein the processing elements are further configured to:

generate a channel switch announcement frame;

transmit the channel switch announcement frame to a wireless device;

receive an acknowledgement message from the wireless device; and terminate a transmission of the mitigation signal in response to receiving the acknowledgement message.

\* \* \* \* \*